United States Patent [19]
Hanke

[11] 3,944,564
[45] Mar. 16, 1976

[54] PREPARATION OF β-COPPER PHTHALOCYANINE WITHOUT MILLING

[75] Inventor: Albert Robert Hanke, Scotch Plains, N.J.

[73] Assignee: E. I. Du Pont de Nemours and Company, Wilmington, Del.

[22] Filed: Mar. 27, 1974

[21] Appl. No.: 455,365

Related U.S. Application Data

[63] Continuation-in-part of Ser. No. 281,970, Aug. 18, 1972, abandoned.

[52] U.S. Cl. .............................................. 260/314.5
[51] Int. Cl.² ........................................ C09B 47/04
[58] Field of Search .................................. 260/314.5

[56] References Cited
UNITED STATES PATENTS
2,359,737 10/1944 Lacey et al. .................... 260/314.5

OTHER PUBLICATIONS
Smith et al., *J. Oil Col. Chem. Assoc.*, Vol. 49, pp. 614–630 (1966).
Anderson et al., *Official Gazz., Oil, Paint & Color Chemists Assoc.*, pp. 184–199 (1963).

*Primary Examiner*—Harry I. Moatz

[57] ABSTRACT

Pigmentary-grade β-copper phthalocyanine (or β-CPC) is prepared without the need for a final milling step by high turbulence drowning of an $H_2SO_4$ solution of crude CPC in water followed by admixture with
a. a water-immiscible halogenated organic liquid and
b. fine-particle size β-CPC to serve as crystallizing seed,
followed by recovery of the pigment.

1 Claim, No Drawings

PREPARATION OF β-COPPER PHTHALOCYANINE WITHOUT MILLING

CROSS-REFERENCE TO RELATED APPLICATION

This application is a continuation-in-part of copending application Ser. No. 281,970 filed Aug. 18, 1972, now abandoned.

BACKGROUND OF THE INVENTION

Products composed essentially of the β-crystal form of CPC have achieved considerable importance as pigments because of outstanding properties with respect to stability, tint, and color intensity. Quite commonly, however, the attainment of such products has required the utilization of costly milling techniques, particularly when the more useful small particle sizes are desired. Thus, for example, a step of phase conversion may be typically necessary to ensure that all of the CPC is in the β-form, yet it is also conductive to the growth of crystals to an excessively large size. Hence there has often been no alternative but to ball mill or similarly finish the resultant material.

A technique widely used for preparing CPC in small particle form involves dissolving crude CPC in sulfuric acid and reprecipitating it in a large volume of water under agitation. However, the product formed is α-CPC, which is characterized by a reddish tint and lack of stability. One modification of this technique, aimed at producing a stable CPC is described in British Pat. No. 824,558. According to the procedure described therein crude CPC is dissolved in a mixture of sulfuric acid with an aliphatic glycol in the presence of an aromatic hydrocarbon solvent and then reprecipitated by adding the solution to vigorously stirred water. The product so produced is more stable than the α-CPC produced by the unmodified technique described above, but is described as having the reddish tint characteristic of the α-phase and would therefore require an additional processing step for conversion to the β-phase, characterized by a greenish shade.

A technique for the production of β-CPC in a small particle size, i.e., of > 40 m²/gram, without the need for a milling step would accordingly be highly attractive.

SUMMARY OF THE INVENTION

The present invention is directed to a process for the production of CPC pigment by the steps of preparing a solution of crude CPC in concentrated sulfuric acid of at least 70 weight percent strength, drowning the sulfuric acid solution in water or dilute acid flowing at a velocity in excess of the critical velocity to provide high turublence and produce a slurry of CPC crystals, and thereafter recovering CPC as a pigment. In particular an improvement is provided for obtaining copper phthalocyanine, having a surface area of at least 40 m²/gram, in the β phase without milling by maintaining the slurry, intermediate to the drowning and recovery steps, under agitation at an acid concentration of less than 40 weight percent and at a temperature of less than about 45°C. for at least about 5 minutes in the presence of a. a quantity of a water-immiscible halogenated organic liquid at least equal in weight to the crude CPC employed, and b. β-CPC as seed, the particle size thereof being not greater than about 0.05 μ and its specific surface area being at least 75 m²/gram, the seed being employed in at least about a 5 weight percent quantity relative to the crude CPC.

The production of CPC in the foregoing manner permits not only the attainment of products essentially composed of the β-crystal form of CPC without the need for a milling step, but additionally it is entirely practical to obtain a particle size of the resultant material which is such that the specific surface area is at least about 40 m²/gram.

The process of the present invention will now be described in greater detail with reference to the following procedural steps.

1. Crude CPC in any crystal modification (or a mixture of the crystal modifications) is dissolved in sulfuric acid of at least 70, and preferably at least 96, weight percent strength. A convenient weight ratio is about one part of CPC to from 5 to 10 parts of the acid.

2. This acid solution of the crude phthalocyanine is drowned into water under conditions of "high turbulence" or "turbulent flow". These terms, as referred to in this specification, have been defined in the prior art (Detrick et al., U.S. Pat. No. 2,334,812) as the motion of a liquid in a pipe at a velocity greater than its critical velocity which is characterized by the presence of innumerable eddy currents, as distinguished from the straight lines of laminar flow where the liquid, although induced to rotate under agitation in currents, still flows for an appreciable time without interruption. The entire specification of that patent to Detrick et al. is hereby incorporated into the present specification by reference.

In "Principles of Chemical Engineering" by Walker Lewis and McAdams, second edition, (1927) pp. 73–77, on page 74 it is pointed out that in case of every fluid flowing through a tube, as the velocity is increased some point is reached where the type of motion suddenly changes from straight line motion to a second type known as turbulent motion, which is characterized by the presence of innumerable eddy currents in the stream. On page 75 of the same text, "critical velocity" is defined as the velocity at which the type of motion changes from straight line to turbulent flow.

According to the process of the present invention, velocities of the drowning liquid through the turbulent flow tube in excess of the critical velocity give an initial pigment particle of very small dimensions, much finer than those obtained by the usual drowning methods.

Effective results have been obtained under a wide variety of conditions with respect to the degree of dilution and the temperature rise accompanying the dilution. The ratio of acid to water in the drowning step controls the temperature rise during this step. The use of about 10 parts of water per part of acid is a convenient ratio for drowning which gives a temperature rise in the order of about 15°–20°C. This has been found to give excellent results. Such a process is readily operable on a large scale where it is possible to pump the acid solution under pressure.

3. Following the high-turbulence drowning, preferably immediately thereafter, the drowned slurry containing CPC crystals in the α form, is then admixed with the water-immiscible halogenated organic liquid and the β-CPC seed to effect formation of β-CPC in the desired particle size. Among the water-immiscible halogenated organic liquids that are useful in the process of this invention are orthodichlorobenzene, trichloroethylene, carbon tetrachloride, perchloroethylene, chloroform and trichloromethane. These organic liquids, as well as others such as xylene, are disclosed in British Pat. No. 824,558 for use with an aliphatic glycol to produce a stabilized pigmentary form of CPC. The amount of the organic liquid should be at least equal on a weight basis to the crude CPC employed, and preferably will be at least five times as much.

The β-CPC seed which is incorporated as a part of the slurry mixture must be smaller than the desired final crystal size of the pigment. This means that the seed should be smaller than about 0.05 micron, i.e., it should have a specific surface of at least about 75 square meters per gram assuming the particles to be spheres. In the examples given hereinafter, seed in the proper particle size range is prepared by milling of crude CPC in the presence of aluminum sulfate, and an organic solvent in accordance with U.S. Pat. No. 3,030,370 (Jackson). Other procedures for obtaining the β-phase seed, provided it has the character described, may be utilized. The amount of seed which is to be used may vary from about 5% by weight, based on the crude CPC employed, up to a maximum amount which is limited only by economic considerations.

Optionally there may be used, along with the organic liquid and seed, a surfactant to serve as a wetting agent for the pigment. The inclusion of such is preferred since it permits forming of a good emulsion of the organic liquid and a more uniform dispersion of the pigment therein. It has been found that a large aqueous/nonaqueous interface hastens phase-conversion and ensures maintenance of the pigmentary particles in a finely-divided form. The presence of a surfactant assists in accomplishing these results. Any surfactant which will reduce the surface tension between the aqueous and nonaqueous phases and hence allow the formation of such an emulsion will be found satisfactory. These agents include ionic and nonionic compositions. The following surfactants have been found useful when used singly or in combination: ethylene oxide reacted with acetylenic glycol, the amine salt of lauryl sulfate, the sodium salt of lauryl sulfate, and the sodium salt of saturated hydrocarbon sulfonate. Although the presence of these surfactants is preferred in carrying out the process of the invention, it is possible to obtain a satisfactory pigmentary product without the use of surfactants if the stirring is vigorous enough to get sufficient contact between the aqueous and nonaqueous phases of the slurry during the conversion and crystal development stage.

The acid concentration during treatment of the slurry with organic liquid and seed should be less than about 40 weight percent. Acid concentrations higher than this slow up the transformation to β-phase and yield products that are redder than typical β-phase CPC. The optimum temperature of the solution depends on the choice of water-immiscible organic liquid and the acid concentration. The more active the liquid in converting the CPC to the β-phase, the lower the temperature should be. Also, the higher the acid concentration of the solution, the lower the temperature should be, since both of these factors directly affect the particle size of the precipitated crystals. The maximum temperature of the solution during the step for particle size growth and crystal development should be about 45°C. and preferably should be around 20°C.

Although a one or two-hour period of agitation at approximately room temperature has been found satisfactory for the development of pigmentary particles in the drowned slurry, this agitation period may be varied from about 5 minutes, if high-speed high-shear agitation is practiced, to about 4 hours if less severe agitation is practiced.

4. After phase conversion has been effected, the water-immiscible organic liquid is removed, e.g., by flash distillation, and recovery of the pigmentary β-CPC product by the usual steps of filtration, washing, and drying.

In order to describe more completely and specifically the process of this invention, the following examples are given. These are for purposes of illustration only and not in limitation of the invention. Parts and percentages therein are by weight unless otherwise specified.

EXAMPLE 1

A first solution is prepared by dissolving 40 grams of crude copper phthalocyanine in 250 ml of 98% sulfuric acid and then cooling the solution to approximately 5°C. In a separate large vessel a mixture is prepared of 400 ml water, 400 ml trichloroethylene, 3 grams of a surfactant (hexadecyl trimethylamine hydrochloride, sold commercially as a 50% active material), and 160 grams of a mill powder containing β-copper phthalocyanine seed of a particle size less than 0.05 $\mu$ and a surface area of greater than 75 m$^2$/gram. The mill powder is prepared by ball milling 20.8 parts of crude copper phthalocyanine with about 123 parts of hydrated aluminum sulfate and about 16 parts of perchloroethylene.

The acid solution containing crude copper phthalocyanine is intially high-turbulence drowned by introducing it into the center of a stream of water flowing through a constricted tube in a state of turbulent flow, that is at a velocity above the critical velocity for the tube or pipe used. The acid is introduced through a small pipe located at the center line of the larger tube and parallel to it, extending through the constriction and ending at the point where the outside pipe resumes it original size. The acid is run into the water in the same direction of flow. Five liters of water at 5°C. are used for the drowning step, thus resulting in a slurry having a temperature of 22°C.

Immediately after the merger of the acid solution and the water in the drowning step, the resultant slurry is run into the vessel containing the mixture of water, trichloroethylene, surfactant and seed. The resultant suspension is stirred at room temperature for 1 hour to complete conversion to the β phase and develop the desired particle size. The pigment, the major portion of which is dispersed in the organic liquid phase of the suspension, is then recovered by filtration, washing and drying.

The pigment is tested for strength in a standard varnish-drier rubout and is found to be stronger than a standard β-copper phthalocyanine pigment prepared by usual grinding techniques; i.e., less of the Example 1 pigment being required to achieve a match in terms of depth of color.

EXAMPLE 2

The procedure given in Example 1 is repeated except that 400 grams perchloroethylene are used in lieu of the trichloroethylene, the surfactant is omitted, and the final suspension is stirred for 2 hours instead of 1 hour while maintaining the temperature at 22°C. The suspension is permitted to stand without agitation for 10 minutes after which the water layer is decanted and the slurry of pigment in perchloroethylene is filtered. The recovered pigment is dried and is found by X-ray diffraction analysis to be almost completely β-phase copper phthalocyanine. Its strength is rated superior to that of a standard β-phase pigment.

EXAMPLE 3

A 10 gram portion of crude copper phthalocyanine is dissolved in 100 ml of 98% sulfuric acid and high-turbulence drowned as in Example 1. Thereafter it is introduced into a mixture of 400 ml perchloroethylene, 400 ml water, 17 grams of sodium lauryl sulfate as a surfactant, and 8.3 grams of mill powder prepared as in Example 1.

Promptly thereafter the suspension is recirculated through a Manton-Gaulin homogenizer at a pressure of 5,000 pounds for approximately 7 minutes and is then filtered and dried.

By X-ray diffraction the pigment is shown to be essentially all in the β-crystal phase. In varnish-drier rubouts it is stronger than a standard β-phase copper phthalocyanine of commerce.

What is claimed is:

1. In a process for the production of copper phthalocyanine pigment by the steps of preparing a solution of crude copper phthalocyanine in concentrated sulfuric acid of at least 70 weight percent strength, drowning the sulfuric acid solution in water or dilute acid flowing at a velocity in excess of the critical velocity to provide high turbulence and produce a slurry of copper phthalocyanine crystals, and thereafter recovering copper phthalocyanine as a pigment, the improvement, for obtaining copper phthalocyanine having a surface area of at least 40 $m^2$/gram in the β phase without milling, wherein intermediate to the drowning and recovery steps the slurry is maintained under high-speed high-shear agitation with an homogenizer at an acid concentration of less than 40 weight percent and at a temperature of less than about 45°C. for about 5–10 minutes in the presence of a. a quantity of a water-immiscible halogenated organic liquid at least equal in weight to the crude copper phthalocyanine employed, said organic liquid being selected from the group consisting of orthodichlorobenzene, trichloroethylene, chloroform, perchloroethylene, carbon tetrachloride and trichloromethane, and b. β-copper phthalocyanine as seed, the particle size thereof being not greater than about 0.05μ and its specific surface area being at least 75 $m^2$/gram, the seed being employed in about a 5 weight percent quantity relative to the crude copper phthalocyanine.

\* \* \* \* \*